United States Patent
Meilland et al.

(10) Patent No.: US 11,928,779 B2
(45) Date of Patent: *Mar. 12, 2024

(54) MULTI-RESOLUTION VOXEL MESHING

(71) Applicant: Apple Inc., Cupertino, CA (US)

(72) Inventors: Maxime Meilland, Nice (FR); Andrew Predoehl, Mountain View, CA (US); Kyle L. Simek, San Jose, CA (US); Ming Chuang, Mountain View, CA (US); Pedro A. Pinies Rodriguez, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/717,393

(22) Filed: Apr. 11, 2022

(65) Prior Publication Data

US 2022/0237872 A1 Jul. 28, 2022

Related U.S. Application Data

(63) Continuation of application No. 17/147,559, filed on Jan. 13, 2021, now Pat. No. 11,328,481.

(Continued)

(51) Int. Cl.
*G06T 17/20* (2006.01)
(52) U.S. Cl.
CPC .......... *G06T 17/20* (2013.01); *G06T 3/4007* (2013.01); *G06T 2200/04* (2013.01)
(58) Field of Classification Search
CPC .................. G06T 17/20; G06T 2200/04
See application file for complete search history.

(56) References Cited

U.S. PATENT DOCUMENTS

2002/0186216 A1* 12/2002 Baumberg ............. G06T 17/20
345/422
2014/0368504 A1 12/2014 Chen et al.
(Continued)

OTHER PUBLICATIONS

Kähler et al., Hierarchical Voxel Block Hashing for Efficient Integration of Depth Images, Jan. 2016, IEEE Robotics and Automation Letters, vol. 1, No. 1, pp. 192-197 (Year: 2016).*

(Continued)

*Primary Examiner* — Samantha (Yuehan) Wang
(74) *Attorney, Agent, or Firm* — Thompson Hine LLP

(57) ABSTRACT

Various implementations disclosed herein generate a mesh representing the surfaces in a physical environment. The mesh is generated using multi-resolution voxels based on detected depth information, e.g., from a depth camera. The techniques may use multiple hash tables to store the multi-resolution voxel data. For example, the hash tables may store each voxel's 3D position and a truncated signed distance field (TSDF) value corresponding to each voxels' distance to a nearest surface. Each of the multiple hash tables may include data corresponding to a different level of resolution and those resolutions may depend upon distance/noise or other factors. For example, voxels close to a depth camera may have a finer resolution and smaller size compared to voxels that are further from the depth camera. Techniques disclosed herein may involve using a meshing algorithm that combines multi-resolution voxel information stored in multiple hash tables to generate a single mesh.

20 Claims, 10 Drawing Sheets

Related U.S. Application Data

(60) Provisional application No. 62/962,481, filed on Jan. 17, 2020.

(56) References Cited

U.S. PATENT DOCUMENTS

| | | | | |
|---|---|---|---|---|
| 2019/0318547 | A1* | 10/2019 | Powers | G06T 17/20 |
| 2021/0166464 | A1* | 6/2021 | Moloney | G06T 15/005 |
| 2021/0192689 | A1* | 6/2021 | Bosse | G06T 7/74 |
| 2021/0225074 | A1* | 7/2021 | Meilland | G06T 17/20 |

OTHER PUBLICATIONS

Sim, Daniel, "Real-Time 3D Reconstruction and Semantic Segmentation Using Multi-Layer Heightmaps", Master Thesis; Sep. 2, 2015; pp. 1-73.

Ylimaki, Markus, "Methods for Image-Based 3-D Modeling Using Color and Depth Cameras", University of Oulu, Finland, Faculty of Information Technology and Electrical Engineering, Dec. 15, 2017, pp. 1-114.

Steinbrucker, Frank, Sturm, Jurgen and Cremers, Daniel, "Volumetric 3D Mapping in Real-Time on a CPU", 2014 IEEE International Conference on Robotics and Automation (ICRA), Sep. 2014, pp. 1-8.

Vespa, Emanuele; Funk, Nils, Kelly, Paul H.J., Leutenegger, Stefan, "Adaptive-resolution octree-based volumetric SLAM"; Department of Computing, Imperial College London, London, UK, 2019 International Conference on 3D Vision(3DV), Sep. 2019, pp. 1-9.

Kahler, Olaf; Prisacariu, Victor, Vaentin, Julien and Murray, David, "Hierarchical Voxel Block Hashing for Efficient Integration of Depth Images", IEEE Robotics and Automation Letters, Dec. 2015, pp. 1-6.

* cited by examiner

MULTI-RESOLUTION VOXEL MESHING

CROSS-REFERENCE TO RELATED APPLICATIONS

This application is a continuation of U.S. application Ser. No. 17/147,559 filed Jan. 13, 2021, which claims the benefit of U.S. Provisional Application Ser. No. 62/962,481 filed Jan. 17, 2020, each of which is incorporated herein in its entirety.

TECHNICAL FIELD

The present disclosure generally relates to generating three-dimensional geometric representations of physical environments, and in particular, to systems, methods, and devices that generate geometric representations based on depth information detected in physical environments.

BACKGROUND

Physical environments have been modeled (e.g., reconstructed) by generating three-dimensional (3D) meshes. These meshes represent 3D surface points and other surface characteristics of the physical environments' floors, walls, and other objects. Such reconstructions may be generated based on images and depth measurements of the physical environments, e.g., using RGB cameras and depth sensors. The reconstruction techniques may provide reconstructions using voxels to generate meshes. Voxels, as used herein, refer to volumetric pixels. Existing reconstruction techniques use voxels of a fixed size that are spaced in a regularly-spaced grid in 3D space without gaps in between the voxels. For example, such reconstruction techniques may accumulate information volumetrically using truncated signed distance functions (TSDFs) that provide signed distance values for voxels within a threshold distance of a surface in the physical environment, where the values represent the distances of such voxels to the nearest respective surfaces in the physical environment. When relatively larger voxels are used by such techniques, the techniques may fail to sufficiently represent detailed characteristics of the physical environments. In contrast, when relatively smaller voxels are used by such techniques, the techniques may yield inaccurate reconstructions due to insufficient noise filtering, and may require undesirable resource usage, e.g., requiring processing that cannot be performed in real-time or memory storage levels that are undesirable or unavailable. Accordingly, existing reconstruction techniques may fail to provide sufficiently accurate and efficient reconstructions of physical environments.

SUMMARY

Various implementations disclosed herein include devices, systems, and methods that generate a mesh (e.g., vertices that form connected triangles) representing the surfaces in a physical environment using multi-resolution voxels that are generated based on detected depth information. In some implementations, the reconstruction techniques use multiple hash tables to store multi-resolution voxel data. For example, the hash tables may store each voxel's 3D position and a truncated signed distance field (TSDF) value corresponding to each voxels' distance to a nearest surface. Each of the multiple hash tables may include data corresponding to a different level of resolution. Those resolutions may be selected based upon distances of the voxels from the sensor, noise in the depth data associated with different voxels, or other factors. For example, voxels close to a depth camera may have a finer resolution and smaller size compared to voxels that are further from the depth camera.

Techniques disclosed herein may achieve various advantages by using multi-resolution voxels. Using multi-resolution voxels provides some portions of a reconstruction with smaller voxels to provide finer resolution and thus potentially higher accuracy and fidelity, and other portions of the reconstruction with larger voxels to provide coarser resolution and thus less accuracy and fidelity. The total number of voxels of all sizes may be less than there would have been if small voxels had been used for all portions of a reconstruction, thus reducing the resources required to determine and process the voxel information. Moreover, voxel size, e.g., which voxels are small and which voxels are large, may be determined using criteria that provides for the use of smaller voxels in areas where doing so will likely result in greater accuracy, e.g., where there is less noise in the data, as opposed to areas where doing so will be less likely to result in greater accuracy, e.g., where there is more noise in the data. Using voxels of appropriately-selected and varying sizes may thus facilitate fast and efficient reconstructions, for example, providing reconstructions with sufficient accuracy and speed for real-time applications.

Techniques disclosed herein may use the multi-resolution voxel data to generate a mesh that reconstructs the geometry of the physical environment. This may involve using a meshing algorithm that combines multi-resolution voxel information stored in multiple hash tables to generate a single mesh. Such an algorithm is configured to account of the different resolutions of the voxels represented in the multiple hash tables.

Some implementations of this disclosure involve an exemplary method of generating a mesh (e.g., vertices that form connected triangles) representing the surfaces in a 3D environment based on depth sensor measurements. The method involves obtaining depth data of a physical environment using a sensor. For example, the depth data can include pixel depth values from a viewpoint and sensor position and orientation data.

The exemplary method further involves generating a first hash table storing 3D positions of a first set of voxels having a first resolution (e.g., big voxels) and signed distance values representing distances to the surfaces (e.g., to a nearest surface) of the physical environment based on the depth data. A distance field may be defined as a scalar field whose value at any given point is equal to the distance from the point to the nearest surface. For example, in some implementations, the signed distance values include TSDF values that may be used to represent voxel distances of each voxel to a nearest surface of the surfaces of the physical environment. The TSDF values can save storage space by including only values within a truncation band in the representation, e.g., only storing data for voxels that are within a threshold distance of a surface.

The exemplary method further involves generating a second hash table storing 3D positions of a second set of voxels having a second resolution (e.g., small voxels) and signed distance values representing distances to the surfaces of the physical environment based on the depth data, where the second resolution is different than the first resolution. For example, the resolution level used for each voxel may be determined based on distance from the sensor, noise, semantics, and the like. For instance, voxels close to the depth camera may have finer resolution and smaller size than voxels that are further from the depth camera.

The exemplary method further involves generating a mesh representing the surfaces based on the first hash table and the second hash table. The mesh may be generated by positioning vertices along a line connecting a first voxel (e.g., a position at the center of the first voxel) of the first set of voxels with a second voxel (e.g., a position at the center of the second voxel) of the second set of voxels. Additionally, or alternatively, vertices are generated between voxels within the same resolution (e.g., whenever there's a zero-crossing, where the TSDF value goes from negative to positive). For example, the mesh may be generated using a marching cubes meshing algorithm technique that identifies lines connecting points associated with the voxels in each hash table and interpolates to identify vertices along those lines that correspond to the surfaces. Performing a marching cubes meshing algorithm may involve parsing one or more hash tables and generating mesh triangles with vertices that represent the surfaces in the volume represented by the hash table(s). For each hash entry, the algorithm may build a vertex list of neighboring voxels of the cube that it belongs to, and identify the triangular surfaces that pass through the cube. In some implementations, generating the mesh includes generating lines connecting points associated with the voxels in each of the multiple hash tables (e.g., between the first hash table and the second hash table, between the second hash table and the third hash table, etc.) and interpolating along the lines to identify vertices for the mesh that correspond to the surfaces. In some implementations, the meshing algorithm extracts deduplicated and manifold meshes.

In some implementations, the exemplary method further involves generating a third hash table storing 3D positions of a third set of voxels having a third resolution and signed distance values representing distances to the surfaces of the physical environment based on the depth data, the third resolution different than the first resolution and the second resolution, wherein the mesh is generated based on the third hash table. Additional hash tables can be generated for each level of resolution desired. In an exemplary implementation, at least four hash tables are utilized for four different resolutions.

In some implementations, the exemplary method further involves determining whether to represent 3D positions as voxels having the first resolution or voxels having the second resolution. In some implementations, the exemplary method further involves determining whether to represent 3D positions as voxels having the first resolution or voxels having the second resolution based on determining noise in the depth data. In some implementations, the exemplary method further involves determining whether to represent 3D positions as voxels having the first resolution or voxels having the second resolution based on distance of surfaces nearest the voxels from a source (e.g., depth camera position) of the depth data. In some implementations, voxels of the first set of voxels have a first size and voxels of the second set of voxels have a second size, where the first size is larger than the second size.

In some implementations, the first hash table and second table use the 3D positions as keys to generate memory addresses storing voxel information. In some implementations, the first hash table and second hash table have memory addresses that store signed distance values.

In some implementations, the depth data is obtained using one or more depth cameras. For example, the one or more depth cameras can acquire depth based on structured light (SL), passive stereo (PS), active stereo (AS), time of flight (ToF), and the like. Depth cameras can provide per-pixel depth information aligned with image pixels from a standard camera. In some implementations, the depth data includes pixel depth values from a viewpoint and a sensor position.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
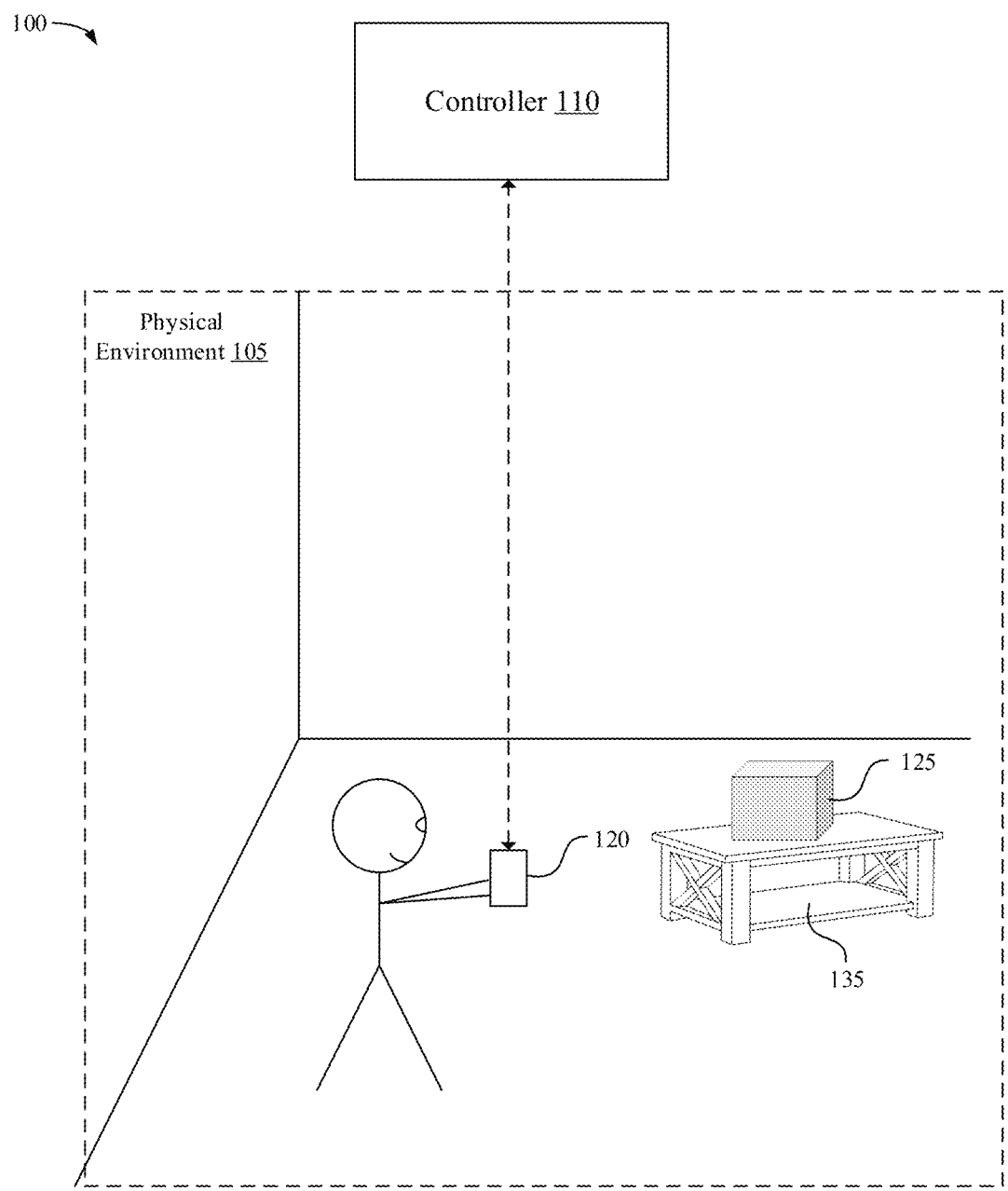
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 is a block diagram of an example operating environment 100 in accordance with some implementations. In this example, the example operating environment 100 illustrates an example physical environment 105 that includes an object 125 and a table 135. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a device 120.

In some implementations, the controller 110 is configured to manage and coordinate an experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with the device 120 via one or more wired or wireless communication channels 144 (e.g., BLUETOOTH, IEEE 802.11x, IEEE 802.16x, IEEE 802.3x, etc.).

In some implementations, the device 120 is configured to present an environment to the user. In some implementations, the device 120 includes a suitable combination of software, firmware, and/or hardware. The device 120 is described in greater detail below with respect to FIG. 3. In some implementations, the functionalities of the controller 110 are provided by and/or combined with the device 120.

In some implementations, the user wears the device 120 on his/her head. As such, the device 120 may include one or more displays provided to display content. For example, the device 120 may enclose the field-of-view of the user. In some implementations, the device 120 is a handheld electronic device (e.g., a smartphone or a tablet) configured to present content to the user. In some implementations, the device 120 is replaced with a chamber, enclosure, or room configured to present content in which the user does not wear or hold the device 120.

Figure 2:
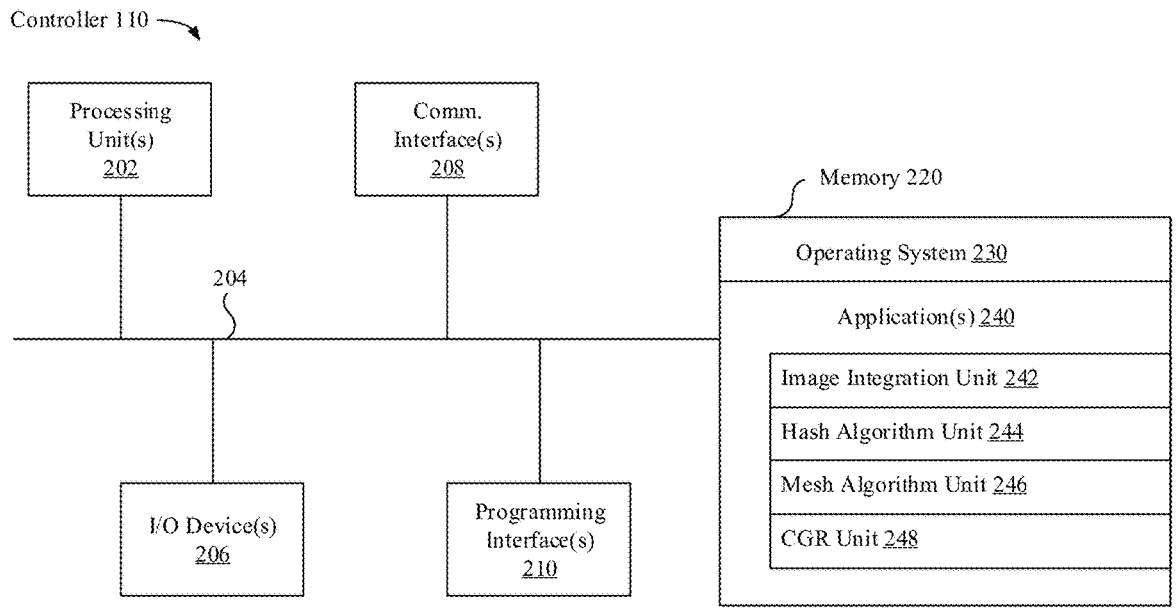
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 includes a non-transitory computer readable storage medium. In some implementations, the memory 220 or the non-transitory computer readable storage medium of the memory 220 stores the following programs, modules and data structures, or a subset thereof including an optional operating system 230 and one or more applications 240.

The operating system 230 includes procedures for handling various basic system services and for performing hardware dependent tasks. In some implementations, the operating system 230 includes built in CGR functionality, for example, including a CGR environment application or viewer that is configured to be called from the one or more applications 240 to display a CGR environment within a user interface. In some implementations, the applications 240 are configured to manage and coordinate one or more experiences for one or more users (e.g., a single experience for one or more users, or multiple experiences for respective groups of one or more users).

The applications 240 include an image integration unit 242, a hash algorithm unit 244, a mesh algorithm unit 246, and a CGR unit 248. The image integration unit 242, the hash algorithm unit 244, the mesh algorithm unit 246, and the CGR unit 248 can be combined into a single application or unit or separated into one or more additional applications or units.

The image integration unit 242 is configured with instructions executable by a processor to obtain the image data (e.g., light intensity data, depth data, etc.) and integrate (e.g., fuse) the image data using one or more of the techniques disclosed herein. For example, image integration unit 242 fuses RGB images from a light intensity camera with a sparse depth map from a depth camera (e.g., time-of-flight sensor) and other sources of physical environment information to output a dense depth point cloud of information.

The hash algorithm unit 244 is configured with instructions executable by a processor to generate hash tables storing 3D positions of voxels and signed distance values representing distances to the surfaces (e.g., to a nearest surface) of the physical environment based on the depth data using one or more of the techniques disclosed herein. For example, the hash algorithm unit 244 may determine hierarchal levels of resolution from the image data and generate a hash table for each level of determined resolution.

The mesh algorithm unit 246 is configured with instructions executable by a processor to perform a meshing algorithm (e.g., a dual marching cubes meshing algorithm, a poisson meshing algorithm, a tetrahedral meshing algorithm, or the like) and generate a mesh representing a room (e.g., physical environment 105) and/or object(s) within a room (e.g., object 125, table 135, etc.) using one or more of the techniques disclosed herein. The computer-generated reality (CGR) unit 248 is configured with instructions executable by a processor to provide a CGR environment that includes depictions of a physical environment including real objects or virtual objects. The virtual objects may be positioned based on the detection, tracking, and representing of objects in 3D space relative to one another based on stored 3D models of the real objects and the virtual objects, for example, using one or more of the techniques disclosed herein.

Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
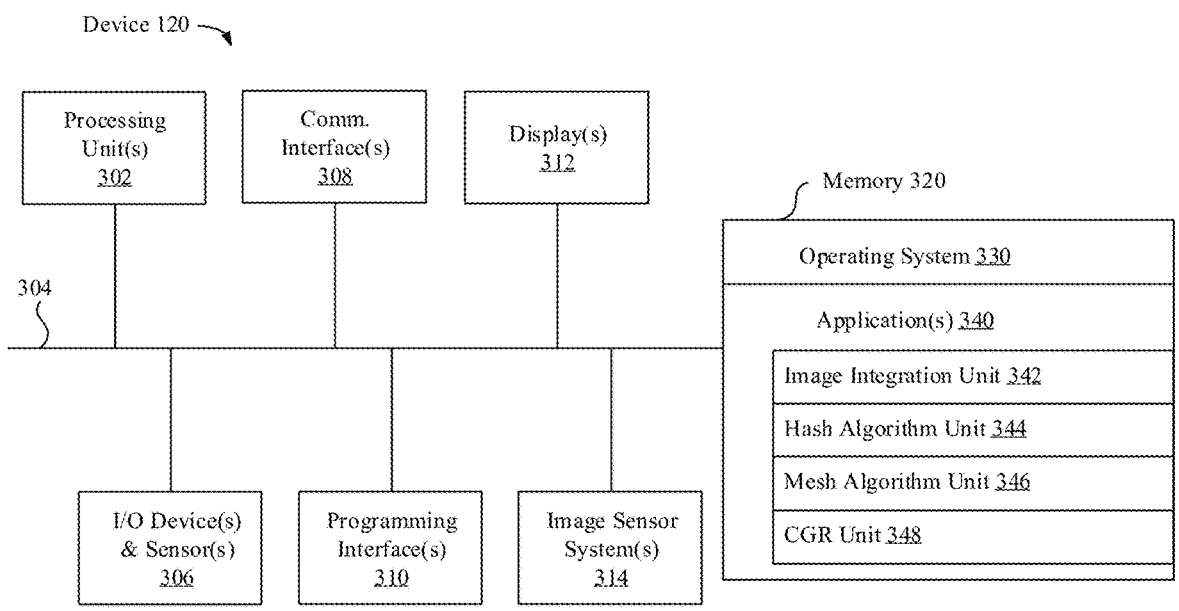
FIG. 3 is a block diagram of an example device in accordance with some implementations.

FIG. 3 is a block diagram of an example of the device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 120, and/or the like type interface), one or more programming (e.g., I/O) interfaces 310, one or more AR/VR displays 312, one or more interior and/or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 312 are configured to present the experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the device 120 includes a single display. In another example, the device 120 includes an display for each eye of the user.

In some implementations, the one or more image sensor systems 314 are configured to obtain image data that corresponds to at least a portion of the physical environment 105. For example, the one or more image sensor systems 314 include one or more RGB cameras (e.g., with a complimentary metal-oxide-semiconductor (CMOS) image sensor or a charge-coupled device (CCD) image sensor), monochrome cameras, IR cameras, event-based cameras, and/or the like. In various implementations, the one or more image sensor systems 314 further include illumination sources that emit light, such as a flash. In various implementations, the one or more image sensor systems 314 further include an on-camera image signal processor (ISP) configured to execute a plurality of processing operations on the image data including at least a portion of the processes and techniques described herein.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 includes a non-transitory computer readable storage medium. In some implementations, the memory 320 or the non-transitory computer readable storage medium of the memory 320 stores the following programs, modules and data structures, or a subset thereof including an optional operating system 330 and one or more applications 340.

The operating system 330 includes procedures for handling various basic system services and for performing hardware dependent tasks. In some implementations, the operating system 330 includes built in CGR functionality, for example, including an CGR environment application or viewer that is configured to be called from the one or more applications 340 to display a CGR environment within a user interface. In some implementations, the applications 340 are configured to manage and coordinate one or more experiences for one or more users (e.g., a single experience for one or more users, or multiple experiences for respective groups of one or more users).

The applications 340 include an image integration unit 342, a hash algorithm unit 344, a mesh algorithm unit 346, and a CGR unit 348. The image integration unit 342, the hash algorithm unit 344, the mesh algorithm unit 346, and the CGR unit 348 can be combined into a single application or unit or separated into one or more additional applications or units.

The image integration unit 342 is configured with instructions executable by a processor to obtain the image data (e.g., light intensity data, depth data, etc.) and integrate (e.g., fuse) the image data using one or more of the techniques disclosed herein. For example, image integration unit 342 fuses RGB images from a light intensity camera with a sparse depth map from a depth camera (e.g., time-of-flight sensor) and other sources of physical environment information to output a dense depth cloud.

The hash algorithm unit 344 is configured with instructions executable by a processor to generate hash tables storing 3D positions of voxels and signed distance values representing distances to the surfaces (e.g., to a nearest surface) of the physical environment based on the depth data using one or more of the techniques disclosed herein. For example, the hash algorithm unit 344 may determine hierarchal levels of resolution from the image data and generate a hash table for each level of determined resolution.

The mesh algorithm unit 346 is configured with instructions executable by a processor to perform a meshing algorithm (e.g., a dual marching cubes meshing algorithm, a poisson meshing algorithm, a tetrahedral meshing algorithm, or the like) and generate a mesh representation of a room (e.g., physical environment 105) and/or object(s) within a room (e.g., object 125, table 135, etc.) using one or more of the techniques disclosed herein. The CGR unit 348 is configured with instructions executable by a processor to provide a CGR environment that includes depictions of a physical environment including real objects or virtual objects. The virtual objects may be positioned based on the detection, tracking, and representing of objects in 3D space relative to one another based on stored 3D models of the real objects and the virtual objects, for example, using one or more of the techniques disclosed herein.

Although these elements are shown as residing on a single device (e.g., the device 120), it should be understood that in other implementations, any combination of the elements may be located in separate computing devices. Moreover, FIG. 3 is intended more as functional description of the various features which are present in a particular implementation as opposed to a structural schematic of the implementations described herein. As recognized by those of ordinary skill in the art, items shown separately could be combined and some items could be separated. For example, some functional modules (e.g., applications 340) shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
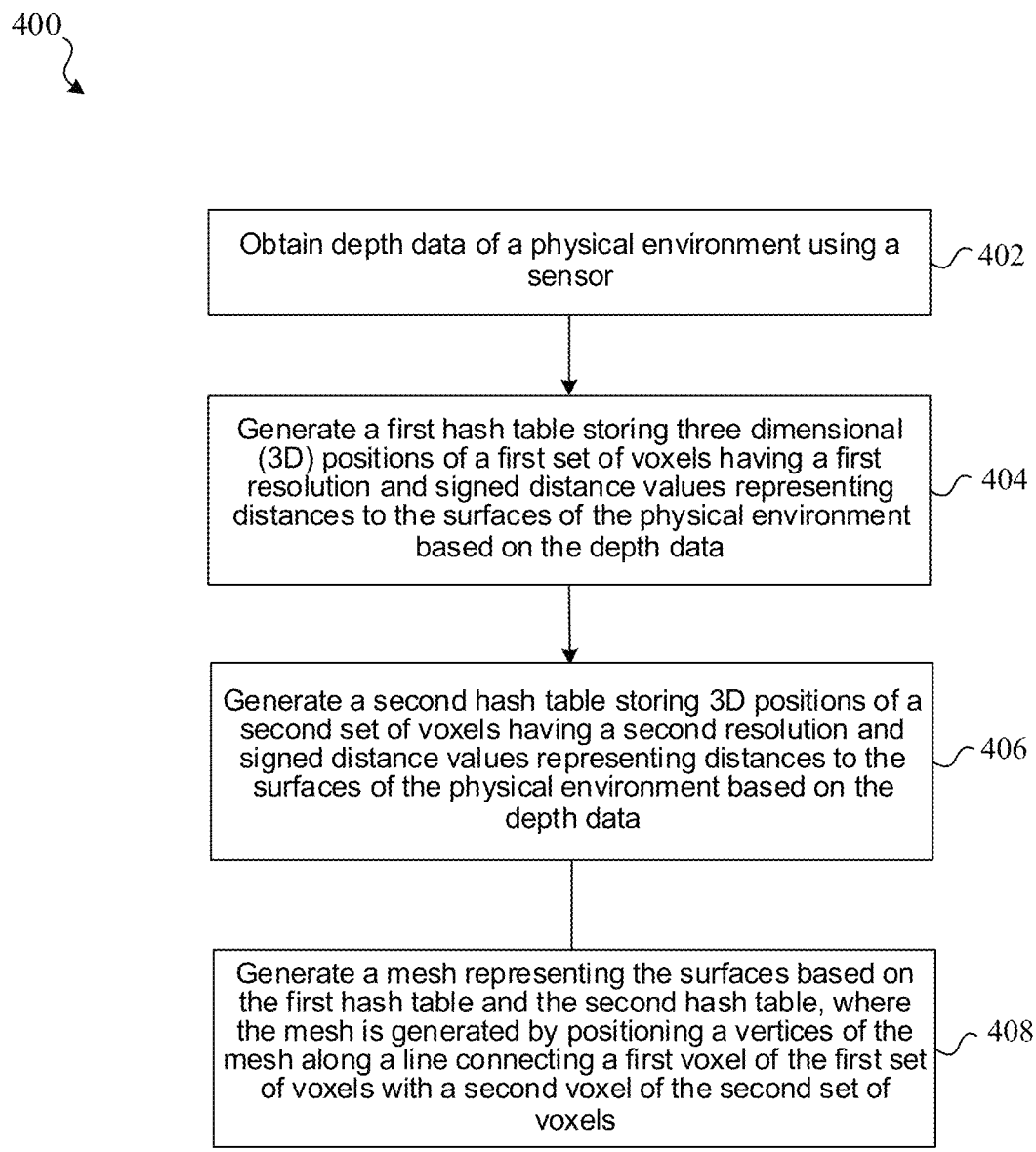
FIG. 4 is a flowchart representation of an exemplary method that generates a mesh representing the surfaces in a 3D environment using multi-resolution hashing data structures based on depth information in accordance with some implementations.

FIG. 4 is a flowchart representation of an exemplary method 400 that generates a mesh using multiple hash tables that represent voxels of multiple resolutions in accordance with some implementations. In some implementations, the method 400 is performed by a device (e.g., device 120 of FIGS. 1 and 2), such as a mobile device, desktop, laptop, or server device. The method 400 can be performed on a device (e.g., device 120 of FIGS. 1 and 3) that has a screen for displaying 2D images and/or a screen for viewing stereoscopic images such as a head-mounted display (HMD). In some implementations, the method 400 is performed by processing logic, including hardware, firmware, software, or a combination thereof. In some implementations, the method 400 is performed by a processor executing code stored in a non-transitory computer-readable medium (e.g., a memory).

The method 400 generates a mesh (e.g., vertices that form connected triangles) representing the surfaces in a 3D environment using multi-resolution hashing data structures based on depth information detected in the physical environment. The method 400 may provide a realistic and physically meaningful reconstruction of a physical environment. The method 400 may efficiently use memory and quickly update a reconstruction as an image capture device (e.g., a mobile phone) scans a physical environment (e.g., a room or hallways of building). The method 400 may generate meshes that are useful in a variety of applications. For example, the method 400 may provide a mesh that facilitates realistic placement and movement of virtual objects that interact with the physical objects in a CGR environment and segmenting of a physical environment in 3D to enable object replacement.

At block 402, the method 400 obtains depth data of a physical environment using a sensor, the physical environment having surfaces. For example, the depth data can include pixel depth values from a viewpoint and sensor position and orientation data. In some implementations, the depth data is obtained using one or more depth cameras. For example, the one or more depth cameras can acquire depth based on structured light (SL), passive stereo (PS), active stereo (AS), time of flight (ToF), and the like. Various techniques may be applied to acquire depth image data to assign each portion (e.g., at a pixel level or a voxel level) of the image. Such techniques may involve obtaining and analyzing depth values, depth images, and depth histograms and may result in the creation of one or more masks that identify portions of the image associated with the different focal depth planes. For example, voxel data (e.g., a raster graphic on a 3D grid, with the values of length, width, and depth) may also contain multiple scalar values such as opacity, color, and density. In some implementations, depth data is obtained from sensors or 3D models of the content of an image. Some or all of the content of an image can be based on a real environment, for example, depicting the physical environment 105 around the device 120. Image sensors may capture images of the physical environment 105 for inclusion in the image and depth information about the physical environment 105. In some implementations, a depth sensor on the device 120 determines depth values for voxels that are determined based on images captured by an image sensor on the device 120. The physical environment 105 around the user may be 3D modeled based on one or more values and subsequent depths of objects depicted in subsequent images of the physical environment can be determined based on the model and camera position information. In some implementations, virtual objects may be presented with the image data in a CGR environment, and the virtual objects may have pre-assigned depth values or coordinates from which such depth values can be determined.

At block 404, the method 400 generates a first hash table storing 3D positions of a first set of voxels having a first resolution and signed distance values representing distances to the surfaces of the physical environment based on the depth data. For example, the first resolution may include bigger voxels at a particular distance from the surface of the physical environment (e.g., an object 125 on the table 135). In some implementations, multiple hash tables are used and each includes memory addresses that store signed distance values. As further discussed herein with reference to FIG. 5, in some implementations, truncated signed distance field (TSDF) values may be used to represent voxel distances of each voxel to a nearest surface of the surfaces of the physical environment corresponding to the depth data. The TSDF values may be used to save substantial storage space by including only values within a truncation band in the representation, e.g., within a threshold distance of a surface.

Further, for example, 3D volumetric data may include distributed voxel addresses, and the stored 3D positions may be used as keys of the hash table entries to provide the (x,y,z) coordinates and to generate memory addresses storing voxel information. For instance, in example 3D volumetric data, each bit may be unique, and the (x,y,z) coordinates of each voxel, may be unique. In one example implementation, an algorithm implemented in a system may take advantage of the unique voxel locations in example 3D volumetric data to provide an addressing scheme which minimizes unordered or excess hash table entries. As further discussed herein with reference to FIG. 6, unordered or excess hash table entries may be hash functions employed in a hashing scheme that generates the same index in a hash table for more than one key.

At block 406, the method 400 generates a second hash table storing 3D positions of a second set of voxels having a second resolution and signed distance values representing distances to the surfaces of the physical environment based on the depth data. The generation of the second hash table in block 406 may be similar to the generation of the first hash table in block 404. However, at block 406, a second resolution is used that is different than the resolution for the first hash table. For example, the second resolution could be a finer resolution and include smaller voxels, and the first hash table may include a coarser resolution and include larger voxels. Different hash tables may include data corresponding to a different level of resolution and those resolutions may depend upon distance, noise, or other factors. Distance may be used as an approximation of noise based on a correlation (e.g., quadratic noise with respect to distance such that farther distance means more noise).

According to some implementations, the method 400 further includes determining whether to represent 3D positions as voxels having the first resolution or voxels having the second resolution. For example, the system may determine the number of levels of resolution that are to be analyzed and represented by hash tables. According to some implementations, the method 400 further includes determining whether to represent 3D positions as voxels having the first resolution or voxels having the second resolution based on determining an estimated noise in the depth data, as discussed herein. According to some implementations, the method 400 further includes determining whether to represent 3D positions as voxels having the first resolution or voxels having the second resolution based on distance of surfaces nearest the voxels from a source of the depth data. For example, the system may determine the number of levels of resolution that are to be analyzed based on the depth camera position and the corresponding depth data of distances to the surfaces of objects in the physical environment, such as the distance to the surface of the object 125.

Additionally, or alternatively, the resolution levels may be determined based on semantic labeling identifying object type (e.g., table, teapot, chair, vase, etc.). In some implementations, semantic labeling uses a machine learning model, where a semantic segmentation model may be configured to identify semantic labels for pixels or voxels of image data. For example, if a voxel is labeled as a "wall," regardless of how far away the object (wall) is, the system can select a bigger/sparser resolution based on the assumption or specification that a wall type object will have a consistent or insignificant texture that need not be represented using fine resolution. If the voxel is labeled as a "tea cup," the system can select a smaller/finer resolution based on the assumption or specification that a tea cup type object will have fine details that are worth attempting to represent regardless of potential noise. In some implementations, the machine learning model is a neural network (e.g., an artificial neural network), decision tree, support vector machine, Bayesian network, or the like.

According to some implementations, a third hash table may be generated to store 3D positions of a third set of voxels having a third resolution and signed distance values representing distances to the surfaces of the physical environment based on the depth data. The third resolution is different than the first resolution and the second resolution. The mesh may be generated based on the third hash table. Additional hash tables may similarly be generated for each more levels of resolution depending upon the implementation or circumstances.

At block 408, the method 400 generates a mesh representing the surfaces based on the first hash table and the second hash table, where the mesh is generated by positioning a vertices of the mesh along a line connecting a first voxel of the first set of voxels with a second voxel of the second set of voxels. For example, the mesh may be generated by positioning a vertices of the mesh along a line connecting a first voxel (e.g., a position at the center of the first voxel) of the first set of voxels with a second voxel (e.g., a position at the center of the second voxel) of the second set of voxels. In some implementations, the mesh may be generated using a dual marching cubes meshing algorithm technique that identifies lines connecting points associated with the voxels in each hash table and interpolates to identify vertices along those lines that correspond to the surfaces. Additionally, or alternatively, vertices are generated between voxels within the same resolution (e.g., whenever there's a zero-crossing, where the TSDF value goes from negative to positive). Using a marching cubes meshing algorithm may involve parsing one or more hash tables and generating mesh triangles with vertices that represent the surfaces in the volume. For each hash entry in the hash table(s), the algorithm may build a vertex list of neighboring voxels of the cube that it belongs to, and identify the triangular surfaces that pass through the cube. In some implementations, generating the mesh includes generating lines connecting points associated with the voxels in both the first hash table and the second hash table, and interpolating along the lines to identify vertices for the mesh that correspond to the surfaces. In some implementations, the meshing algorithm extracts deduplicated and manifold meshes. Alternatively, other suitable meshing algorithms (e.g., a poisson meshing algorithm, a tetrahedral meshing algorithm, or the like) may be used.

Figure 5:
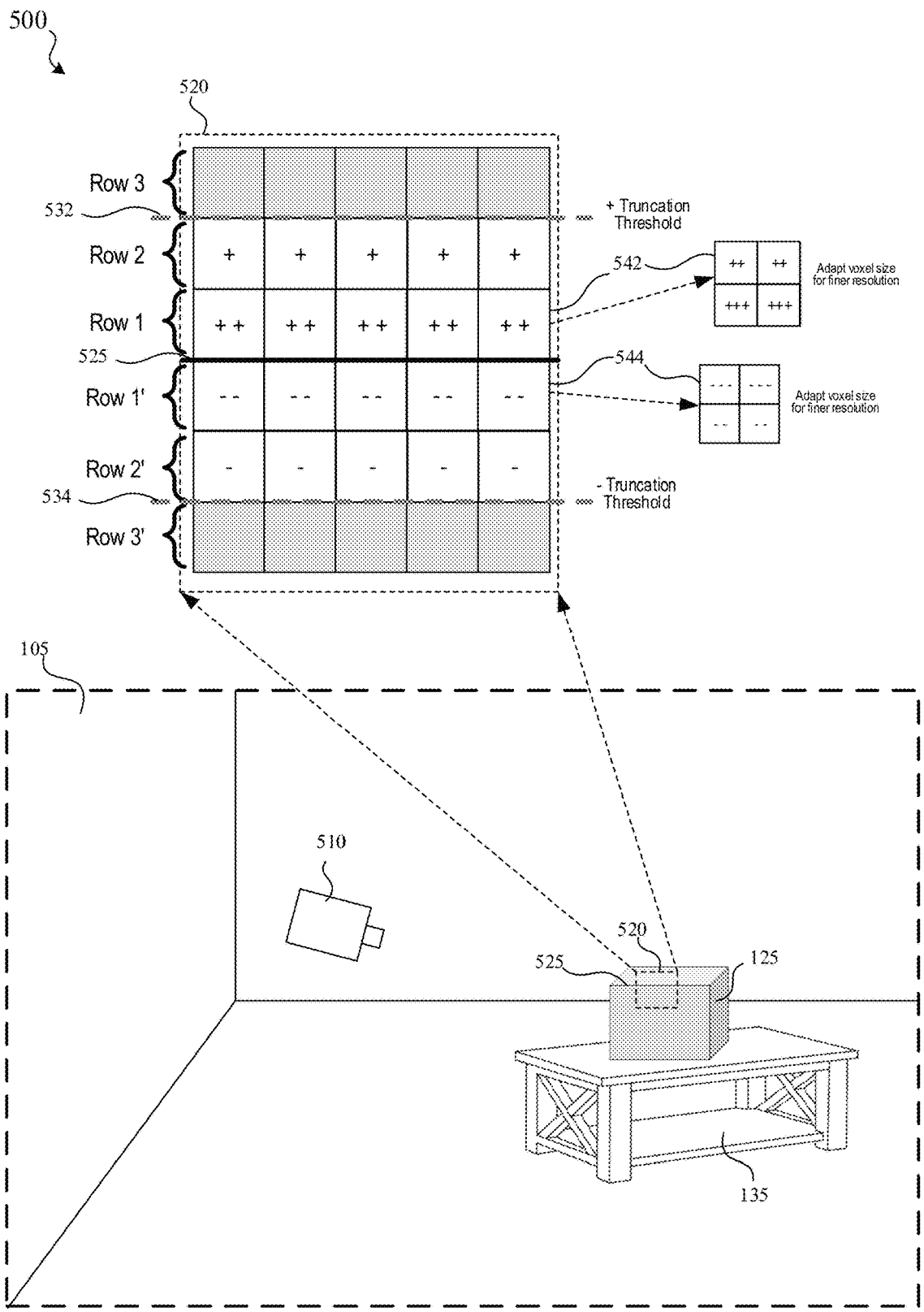
FIG. 5 is a block diagram illustrating example truncated signed distance field (TSDF) values of an area of depth data in accordance with some implementations.

FIG. 5 is a block diagram of an example operating environment 500 illustrating example truncated signed distance field (TSDF) values of an area 520 of depth data in accordance with some implementations. In this example, the example operating environment 500 illustrates an environment that includes a device 510, an object 125, and a table 135. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 500 includes a device 510.

In some implementations, the device 510 may include one or more depth sensors (e.g., a structured light, a time-of-flight, or the like). As shown in FIG. 5, the device 510 is angled towards the object 125. The object 125 includes an edge 525 that is closest to the device 510. The area 520 of the object 125 is expanded upon at the voxel level in a two-dimensional (2D) representation in a grid format for illustrative purposes to demonstrate the truncated signed distance functions (TSDF) values. A signed distance value is stored if a voxel is within the truncation threshold. As shown, Row 1 and Row 1' are at a "++" and "−−" distance respectively, and Row 2 and Row 2' are at a "+" and "−" distance respectively, each being within the positive truncation threshold 532 or negative truncation threshold 534. However, Row 3 and Row 3' are outside of the respective truncation threshold, thus there is no signed distance function stored. Or, in other words, the signed distance is truncated or ignored for those voxels outside of the respective truncation threshold. In the exemplary implementation, more than one resolution level is utilized by the hashing and meshing systems. Thus, voxels 542 and 544 are shown as an example where a voxel can be adapted and divided into smaller voxels for finer resolutions. Additionally, each of the four voxels within each of the voxels 542 and 544 can be divided further, depending on the level of resolution required. Each level of resolution determined by the system to be utilized is then stored in a separate hashing data structure, as further described below with reference to FIG. 6.

Figure 6:
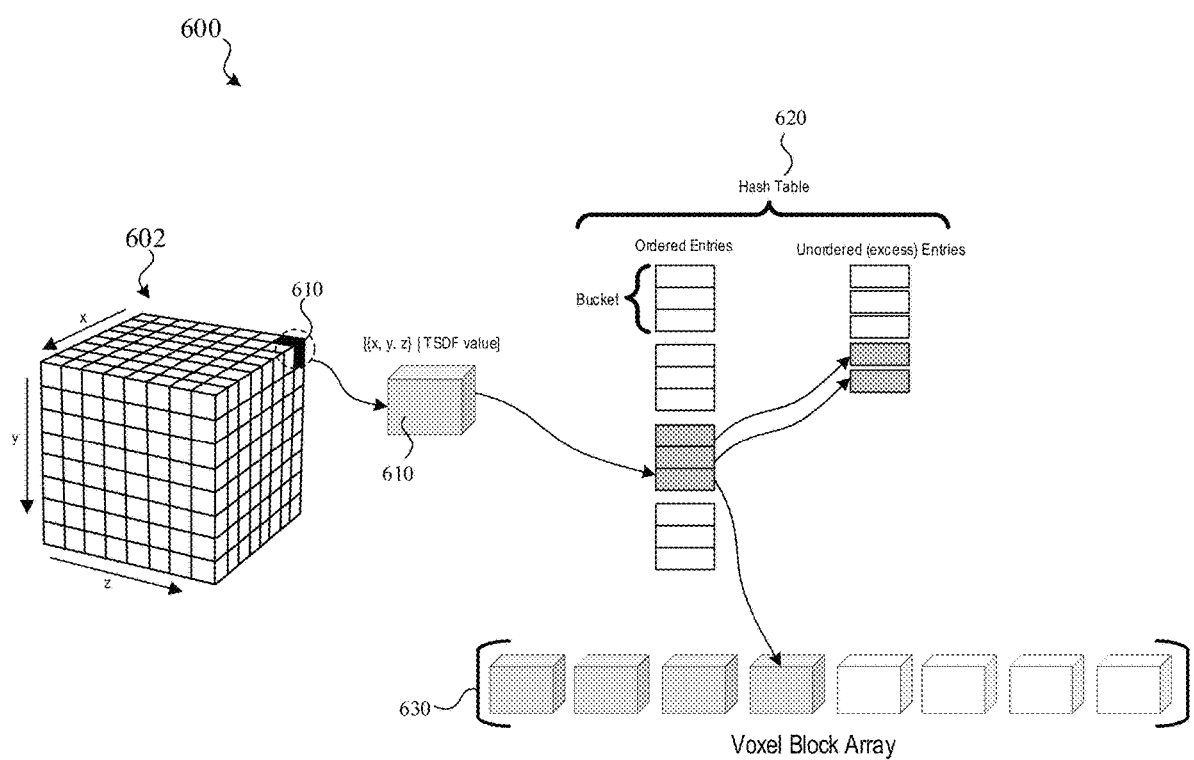
FIG. 6 is a block diagram illustrating a hashing data structure in accordance with some implementations.

FIG. 6 is a block diagram illustrating an example environment 600 for a multi-resolution hashing data structure in accordance with some implementations. The example environment 600 includes an 8×8×8 single resolution orthogonal (uniform) voxel grid 602. The voxel grid 602 represents all the information in a volume by a fixed 3D grid of voxels that is pre-allocated in memory. While the voxel grid 602 results in a constant access time for each voxel to store and retrieve its TSDF values, the fact that the memory has to be pre-allocated makes it impractical to store large volumes, which can run into tens of gigabytes even for a decent sized room. Each voxel (e.g., voxel 610) can include the global (x,y,z) coordinates, and the TSDF values. An even more compact representation can be made using a hash function H(x,y,z) that maps world coordinates to voxels. Thus, the information in voxel 610 is shown in the example environment 600 as stored in the hash table 620. The hash table 620 stores hash entries, each hash entry containing a pointer to an allocated voxel block (e.g., voxel 610). For each voxel, the information is stored in buckets based on different parameters (e.g., stored information may include the world coordinates (x,y, z), TSDF values, and an offset value for bucket excess entries). For example, the hash table 620 may be broken down into a set of buckets, where each slot is either unallocated or contains an entry (shaded grey). Each bucket is then stored as a voxel block array 630 for every ordered voxel entry, removing all excess entries.

The hash table 620 represents the volume as a hash map, with a hash function to access a voxel, such as voxel 610. The hash table 620 allows for a dynamic allocation and management of voxels in space. Additionally, hash table 620 provides the ability to associate and retrieve metadata in real time for every voxel in addition to TSDF information. For example, material or object classification property of each voxel can be retrieved quickly, as compared to octrees which may require extensive search for similar capability. Hash table 620 provides the ability to break a large volume into smaller 3D grids and manage multiple local and global hash tables at different hierarchies (e.g., based on different resolution levels) with efficient merges and updates between them, based on the platform compute availability and application requirements. In other words, an advantage of using a hash table is that it doesn't a priori impose bounds on the volume to be reconstructed and by design grows the map as needed.

Figure 7:
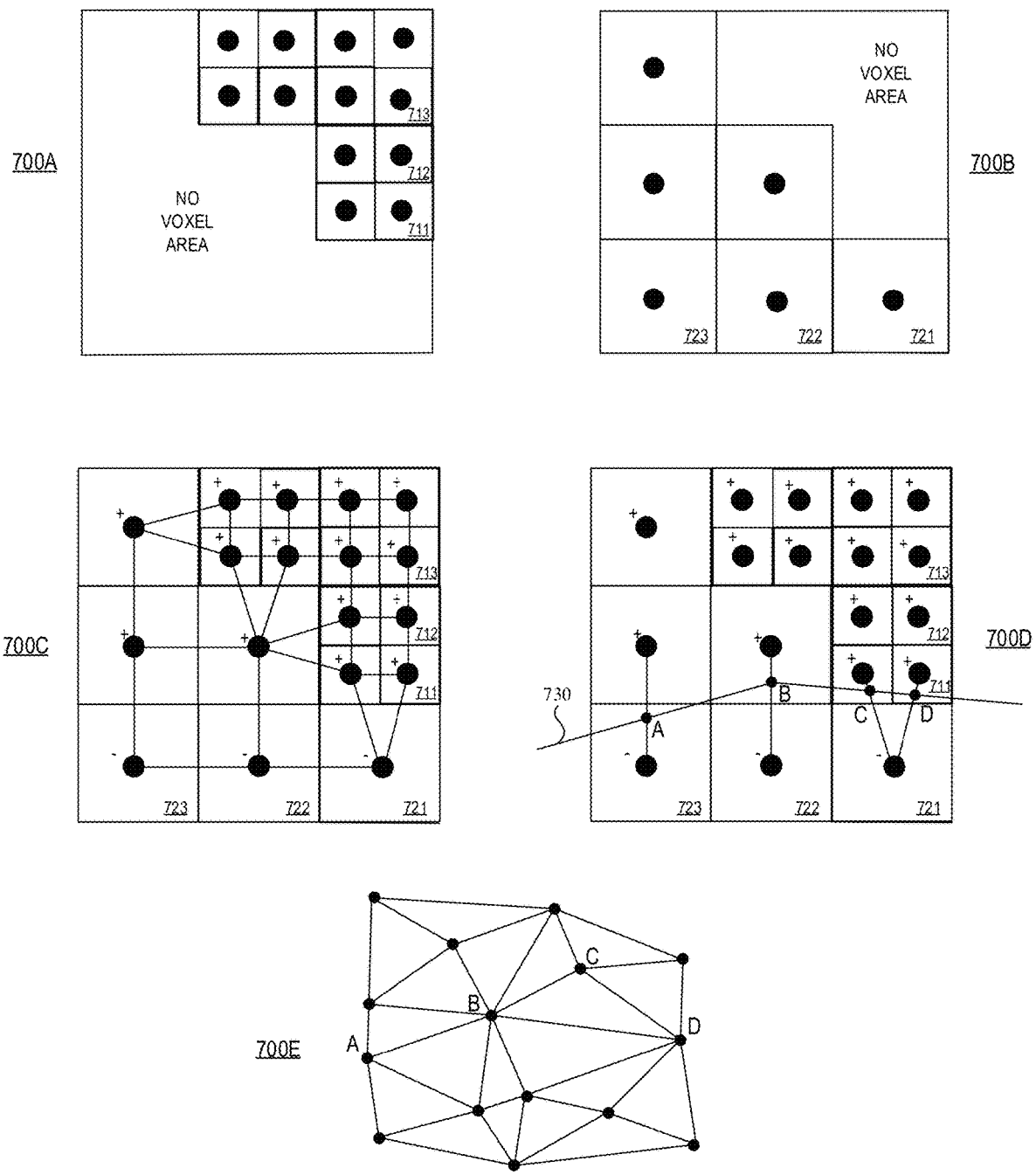
FIG. 7 are block diagrams illustrating multi-resolution hashing data structures representations and a mesh representation in accordance with some implementations.

FIG. 7 includes block diagrams illustrating example multi-resolution hashing data structure representations (e.g., example voxel representations 700A-700D) and a 2D mesh representation (e.g., mesh representation 700E) in accordance with some implementations. Example voxel representations 700A-700D are 2D representations of voxels. For example, example voxel representation 700A is a representation showing voxels (e.g., voxels 711, 712, 713) at a first resolution for a first hash table, and example voxel representation 700B is a representation showing voxels (e.g., voxels 721, 722, 723) at a second resolution that is different than first resolution for a second hash table. The world coordinates and the voxel size and shape of voxels in the first hash table for voxel representation 700A are used to determine that voxel 711 is adjacent to voxel 712, but not adjacent to voxel 713. The world coordinates and the voxel size and shape of voxels in the second hash table for voxel representation 700B are used to determine that voxel 721 is adjacent to voxel 722 but not adjacent to voxel 723. Moreover, the world coordinates and the voxel size and shape of voxels in both the first and second hash tables are used to determine that voxel 721 is adjacent to voxel 711, but not adjacent to voxel 712.

The "no voxel area" in voxel representations 700A, 700B are for illustrative purposes to exemplify that a hash table representation for a particular resolution is only creating tables for that particular resolution. For example, voxel representation 700A is representing a finer resolution and therefore is shown with smaller voxels (e.g., voxels 711, 712, 713), voxel representation 700B is representing a more sparse or coarse resolution and therefore is shown with larger voxels (e.g., voxels 711, 712, 713) compared to the voxel sizes of voxel representation 700A.

Although not shown, another voxel representation maybe shown for a third and finer resolution with smaller voxels. For example, voxel 711 maybe divided into four smaller voxels for a separate hash table that represents that third resolution.

Example voxel representation 700C is a 2D representation of voxels combined from multiple hash tables (e.g., the first hash table of voxel representation 700A and the second hash table of voxel representation 700B) with lines connecting adjacent voxels and markings (e.g., + or −) illustrating voxel distance signs. For example, the example voxel representation 700C shows the topology of a voxel grid for two levels of resolution where each vertex of the voxel grid is placed at the center of each voxel. The voxel distance signs (e.g., "+" and "−") are used to illustrate which voxels are positive "+" or above and negative "−" or below a detected outside edge of a surface of an object, as shown in example voxel representation 700D.

As illustrated in example voxel representation 700D, lines between voxels having different signed values are considered, and the edge 730 includes mesh vertices A, B, C, D that are selected along these lines based on interpolation and the depth data. For example, edge 730 in example voxel representation 700D may represent edge 525 of the object 125 in FIG. 5.

FIGS. 8-10 illustrate example 3D mesh reconstructions using a dense TSDF map, a sparse TSDF map and a hash table for a single resolution, and a sparse TSDF map and hash tables for a multi-resolution mesh, respectively. FIGS. 8-10 illustrate comparisons between generating a mesh using multi-resolution hashing data structures (e.g., FIG. 10), compared to two other techniques (e.g., FIGS. 8 and 9) at three different data acquisition time intervals (e.g., 0, 6, and 12 seconds).

Figure 8A:
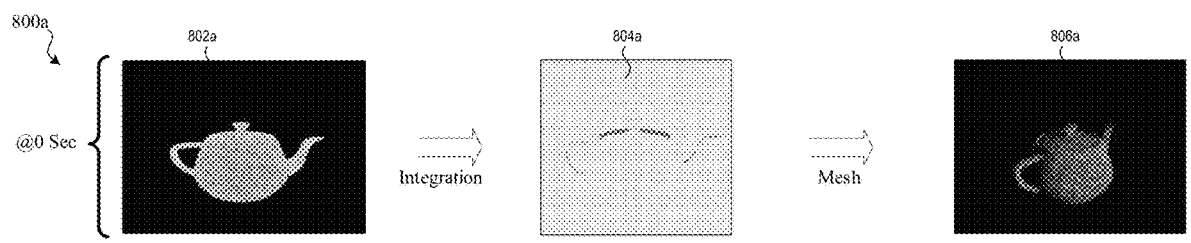
FIGS. 8A-8C are block diagrams illustrating example images during 3D reconstruction using a dense TSDF map according to certain implementations.
Figure 8B:
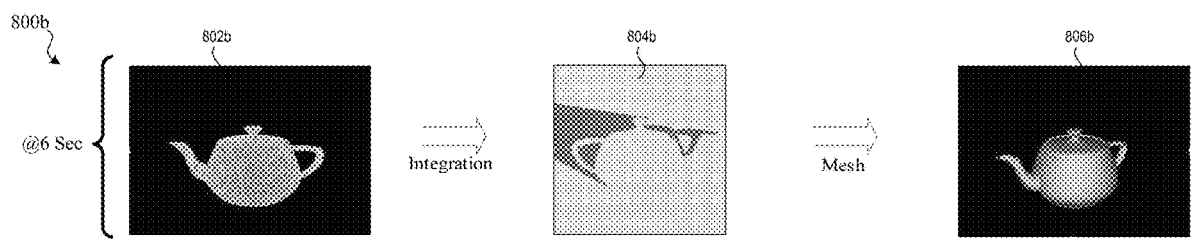
Figure 8C:
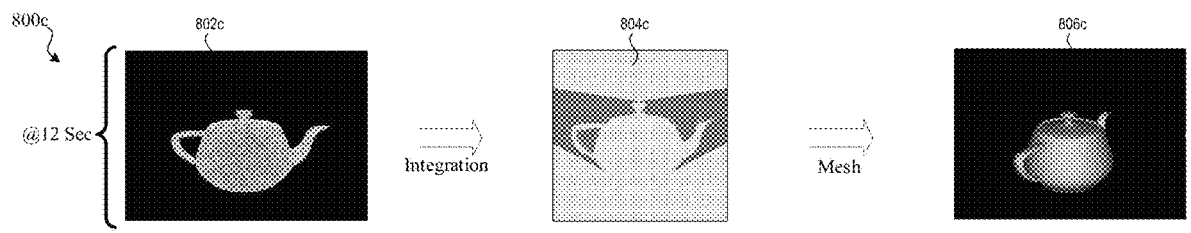

In one implementation, FIGS. 8A-8C are block diagrams illustrating example images during 3D reconstruction of an object (e.g., a teapot) using a dense TSDF map according to certain implementations. In particular, during a 3D reconstruction meshing process, example environments 800a-800c represent three different data acquisition time intervals, example environments 800a at an initial time (e.g., t at 0 seconds), example environments 800b at a first midpoint time (e.g., t at 6 seconds), and example environments 800b at a subsequent midpoint time or end time (e.g., t at 12 seconds) to signify an end of data acquisition. Alternatively, additional or less time may be used to acquire and generate a mesh. Additionally, the example time intervals—0, 6, and 12 seconds—are for example purposes only to illustrate the process for the generated 3D reconstruction mesh. For example, screenshots 802a-802c represent dense point cloud data that has been integrated from obtained image data that includes depth data (e.g., RGB-D data). For example, the obtained image data from device 510 in FIG. 5. Screenshots 804a-804c represent dense truncated signed distance field data. The dense data is utilized for high resolution reconstructions. Screenshots 806a-806c represent the 3D reconstructed mesh that were generated based on the received dense truncated signed distance field data.

Figure 9A:
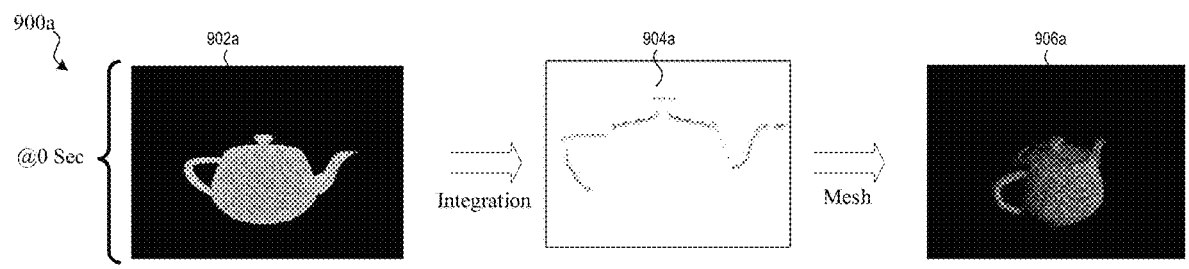
FIGS. 9A-9C are block diagrams illustrating example images during 3D reconstruction using a sparse TSDF map and a hash table for a single resolution mesh according to certain implementations.
Figure 9B:
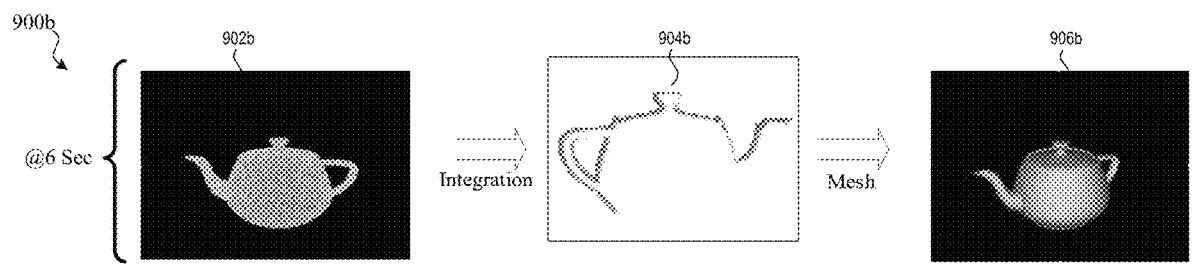
Figure 9C:
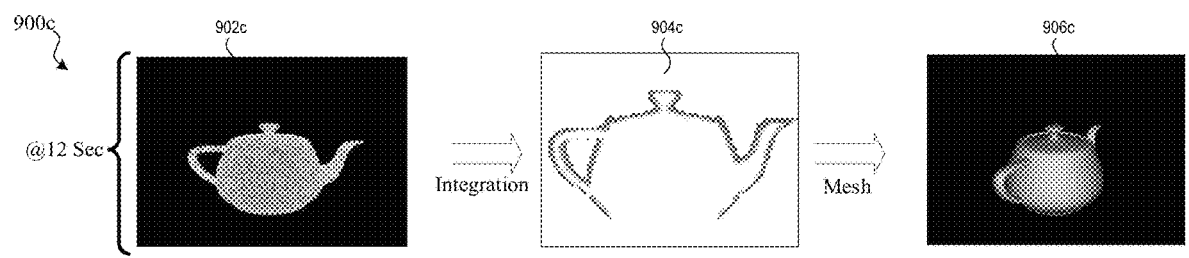

In one implementation, FIGS. 9A-9C are block diagrams illustrating example images during 3D reconstruction of an object (e.g., a teapot) using a sparse TSDF map and a hash table for a single resolution mesh according to certain implementations. In particular, during a 3D reconstruction mesh, example environments 900a-900c represent three different data acquisition time intervals, example environments 900a at an initial time (e.g., t at 0 seconds), example environments 900b at a first midpoint time (e.g., t at 6 seconds), and example environments 900b at a subsequent midpoint time or end time (e.g., t at 12 seconds) to signify an end of data acquisition. Alternatively, additional or less time may be used to acquire and generate the mesh. Additionally, the example time intervals—0, 6, and 12 seconds—are for example purposes only to illustrate the process for the generated 3D reconstruction mesh. For example, screenshots 902a-902c represent dense point cloud data that has been integrated from obtained image data that includes depth data (e.g., RGB-D data). For example, the obtained image data from device 510 in FIG. 5. Screenshots 904a-904c represent sparse truncated signed distance field data using a single hash table algorithm for one level resolution. Screenshots 906a-906c represent the 3D reconstructed mesh that were generated based on the received sparse truncated signed distance field data and single hash table data.

Figure 10A:
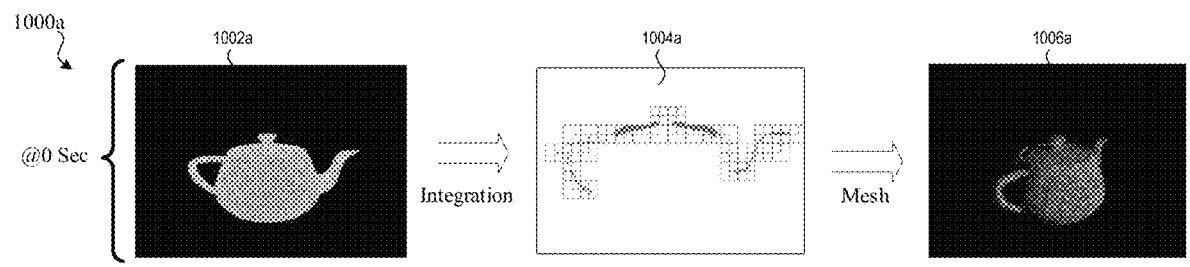
FIGS. 10A-10C are block diagrams illustrating example images during 3D reconstruction using a sparse TSDF map and multiple hash tables for a multi-resolution mesh according to certain implementations.
Figure 10B:
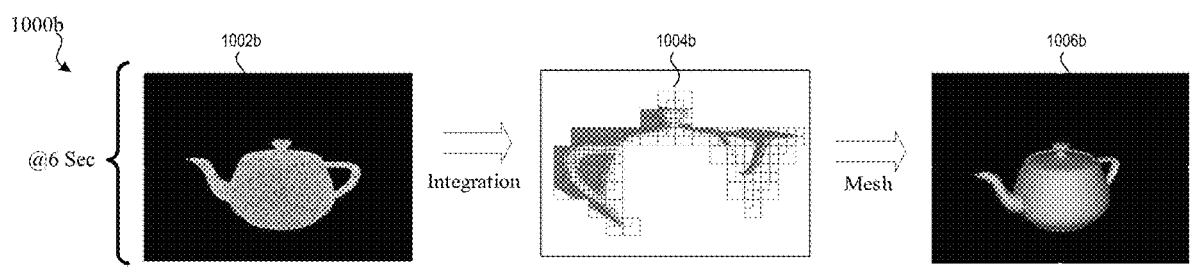
Figure 10C:
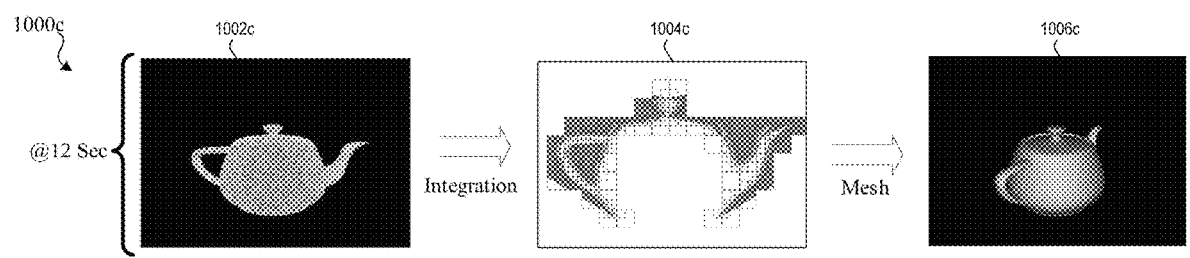

In an exemplary implementation, FIGS. 10A-10C are block diagrams illustrating example images during 3D reconstruction of an object (e.g., a teapot) using a sparse TSDF map and hash tables for a multi-resolution mesh according to certain implementations. In particular, during a 3D reconstruction meshing process, example environments 1000a-1000c represent three different data acquisition time intervals, example environments 1000a at an initial time (e.g., t at 0 seconds), example environments 1000b at a first midpoint time (e.g., t at 6 seconds), and example environments 1000b at a subsequent midpoint time or end time (e.g., t at 12 seconds) to signify an end of data acquisition. Alternatively, additional or less time intervals may be used to acquire and generate the mesh 3D reconstruction. Additionally, the example time intervals—0, 6, and 12 seconds—are for example purposes only to illustrate the process for the generated 3D reconstruction mesh. For example, screenshots 1002a-1002c represent dense point cloud data that has been integrated from obtained image data that includes depth data (e.g., RGB-D data). For example, the obtained image data from device 510 in FIG. 5. Screenshots 1004a-1004c represent sparse truncated signed distance field data utilizing multiple hash tables for a multi-resolution mesh 3D reconstruction. Screenshots 1006a-1006c represent the 3D reconstructed mesh that were generated based on the received data utilizing multiple hash tables for a multi-resolution.

Figure 11:
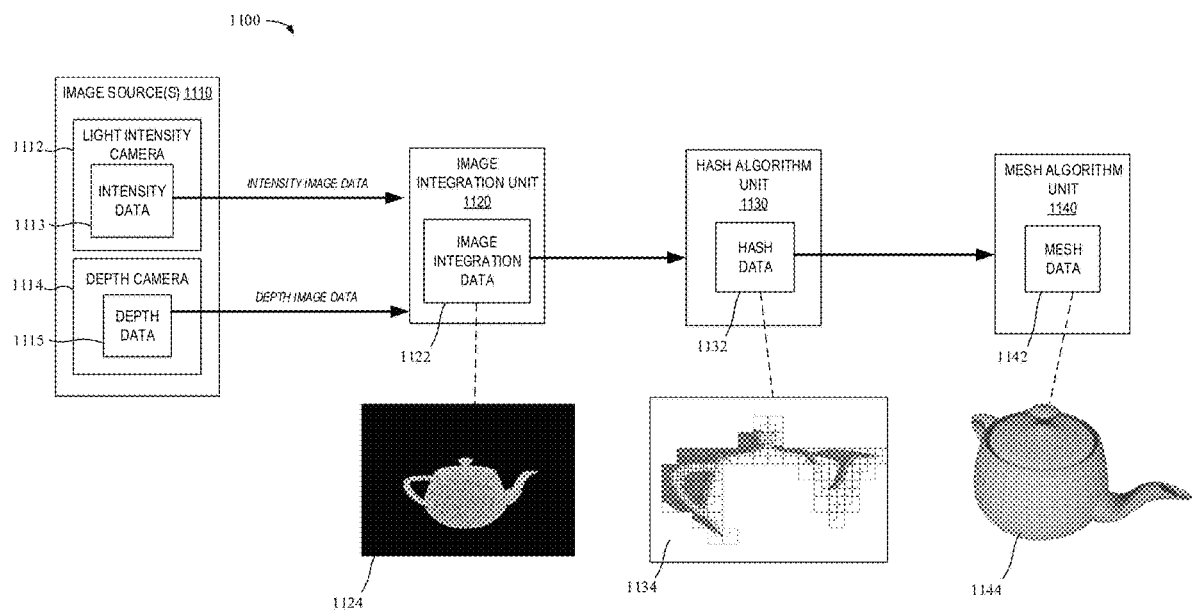
FIG. 11 is a system flow diagram of an example generation of a mesh representing the surfaces in a 3D environment using multi-resolution hashing data structures based on depth information according to certain implementations.

FIG. 11 is a system flow diagram of an example environment 1100 in which a system can generate a mesh (e.g., vertices that form connected triangles) representing the surfaces in a 3D environment using multi-resolution hashing data structures based on depth information detected in the physical environment. In some implementations, the system flow of the example environment 1100 is performed on a device (e.g., device 120 of FIGS. 1 and 2), such as a mobile device, desktop, laptop, or server device. The system flow of the example environment 1100 can be performed on a device (e.g., device 120 of FIGS. 1 and 3) that has a screen for displaying 2D images and/or a screen for viewing stereoscopic images such as a head-mounted display (HMD). In some implementations, the system flow of the example environment 1100 is performed on processing logic, including hardware, firmware, software, or a combination thereof. In some implementations, the system flow of the example environment 1100 is performed on a processor executing code stored in a non-transitory computer-readable medium (e.g., a memory).

The system flow of the example environment 1100 acquires image data of an object (e.g., a teapot) and generates a mesh 1144 representing the surfaces in a 3D environment using multi-resolution hashing data structures 1134. The mesh 1144 is based on depth information detected in the physical environment that is integrated (e.g., fused) to recreate the physical environment.

In an example implementation, the environment 1100 includes an image composition pipeline that acquires or obtains data (e.g., image data from image source(s) 1110) for an object of a physical environment (e.g., object 125 of the physical environment 105 of FIGS. 1 and 5). Example environment 1100 is an example of acquiring image data (e.g., light intensity data and depth data) for a plurality of image frames. The image source(s) 1110 may include a depth camera 1114 that acquires depth data 1115 of the physical environment, and a light intensity camera 1112 (e.g., RGB camera) that acquires intensity data 1113. Additionally, or alternatively, in some implementations, the image composition pipeline includes virtual content (e.g., a virtual box on the table 135) that is generated for a CGR environment, as described herein. For example, the image composition pipeline may include a CGR unit (e.g., CGR unit 248 of FIG. 2, and CGR unit 348 of FIG. 3) that is configured with instructions executable by a processor to provide a CGR environment that includes depictions of a physical environment including real physical objects and virtual content. The CGR unit can generate virtual depth data (e.g., depth images of virtual content) and virtual intensity data (e.g., light intensity images (e.g., RGB) of the virtual content).

A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. In some implementations, the image data is pixel-registered with the images of the physical environment 105 (e.g., RGB, depth, and the like) that is utilized with the imaging process techniques within the CGR environment described herein.

Examples of CGR include virtual reality and mixed reality. A virtual reality (VR) environment refers to a simulated environment that is designed to be based entirely on computer-generated sensory inputs for one or more senses. A VR environment includes virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The example environment 1100 further includes an image integration unit 1120 (e.g., image integration unit 242 of FIG. 2, and/or image integration unit 342 of FIG. 3) that is configured with instructions executable by a processor to obtain the image data (e.g., light intensity data, depth data, etc.) and integrate (e.g., fuse) the image data using one or more of the techniques disclosed herein. For example, the image integration unit 1120 receives depth image data 1115 and intensity image data 1113 from the image sources 1110 (e.g., light intensity camera 1112 and depth camera 1114), and integrates the data and generates image integration data 1122. The image integration data 1122 can include dense point cloud data 1124 (e.g., imperfect depth maps and camera poses for a plurality of image frames around the object) that is sent to a hashing and meshing algorithm. For example, image integration unit 1120 fuses RGB images from a light intensity camera with a sparse depth map from a depth camera (e.g., time-of-flight sensor) and other sources of physical environment information to output a dense depth point cloud of information.

The example environment 1100 further includes a hash algorithm unit 1130 (e.g., hash algorithm unit 244 of FIG. 2, and/or hash algorithm unit 344 of FIG. 3) that is configured with instructions executable by a processor to perform generate hash tables storing 3D positions of voxels and signed distance values representing distances to the surfaces (e.g., to a nearest surface) of the physical environment based on the depth data using one or more of the techniques disclosed herein. For example, the hash algorithm unit 1130 may determine hierarchal levels of resolution from the image data and generate a hash table for each level of determined resolution. The hash algorithm unit 1130 obtains the image integration data 1122 to generate the hash data 1132, which for the example teapot in FIG. 11, is a multi-resolution hashing data structure 1134, using one or more of the hashing techniques disclosed herein with reference to FIGS. 7 and 8.

The example environment 1100 further includes a mesh algorithm unit 1140 (e.g., mesh algorithm unit 246 of FIG. 2, and/or mesh algorithm unit 346 of FIG. 3) that is configured with instructions executable by a processor to perform a meshing algorithm (e.g., a dual marching cubes meshing algorithm, a poisson meshing algorithm, a tetrahedral meshing algorithm, or the like) and generate a mesh representation of a room (e.g., physical environment 105) and/or object(s) within a room (e.g., object 125, table 135, etc.) using one or more of the techniques disclosed herein. The mesh algorithm unit 1140 obtains the hash data 1132 from the hash algorithm unit 1130 and performs a meshing algorithm to generate mesh data 1142. For example, the mesh data 1142 for the example teapot mesh 1144 may be generated using a marching cubes meshing algorithm technique that identifies lines connecting points associated with the voxels in each hash table and interpolating to identifying vertices along those lines that correspond to the surfaces. This meshing technique is disclosed herein with reference to FIG. 8.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device having a processor and a sensor:
   obtaining depth data of a physical environment using the sensor at a sensor position, the physical environment comprising surfaces;
   determining, based on the depth data and determined distances to the surfaces of the physical environment, a plurality of resolutions associated with the obtained depth data;
   determining, based on the determined plurality of resolutions, multi-resolution voxels that include at least a first set of voxels that comprises a first resolution and a second set of voxels that comprises a second resolution that is different than the first resolution based on the first set of voxels being positioned at distances within a first distance range of the sensor position and the second set of voxels being positioned at distances within a second distance range of the sensor position; and
   generating a single mesh of different resolutions by positioning vertices along a line connecting a first voxel of the first set of voxels corresponding to the first resolution with a second voxel of the second set of voxels corresponding to the second resolution, wherein the single mesh is generated directly from the multi-resolution voxels.

2. The method of claim 1, wherein the single mesh is generated based on a first hash table and a second hash table.

3. The method of claim 2, wherein:
   the first hash table is generated based on storing three-dimensional (3D) positions of the first set of voxels having signed distance values representing distances to the surfaces of the physical environment based on the depth data; and
   the second hash table is generated based on storing 3D positions of the second set of voxels having signed distance values representing distances to the surfaces of the physical environment based on the depth data.

4. The method of claim 3, wherein the signed distance values comprise truncated signed distance field (TSDF) values representing voxel distances of each voxel to a nearest surface of the surfaces of the physical environment corresponding to the depth data.

5. The method of claim 3, wherein the first hash table and second table use the 3D positions as keys to generate memory addresses storing voxel information.

6. The method of claim 2, wherein the first hash table and second hash table comprise memory addresses that store signed distance values.

7. The method of claim 2, wherein generating the single mesh comprises:
   generating lines connecting points associated with the first set of voxels and the second set of voxels in both the first hash table and the second hash table; and
   interpolating along the lines to identify vertices for the single mesh that correspond to the surfaces.

8. The method of claim 1, further comprising determining whether to represent 3D positions as the first set of voxels or 3D positions as the second set of voxels.

9. The method of claim 1, further comprising determining whether to represent 3D positions as the first set of voxels or 3D positions as the second set of voxels based on determining noise in the depth data.

10. The method of claim 1, further comprising determining whether to represent 3D positions as the first set of voxels or 3D positions as the second set of voxels based on distance of surfaces nearest each voxel from a source of the depth data.

11. The method of claim 1, further comprising determining whether to represent 3D positions as the first set of voxels or 3D positions as the second set of voxels based on semantic labels identified for surfaces nearest each voxel.

12. The method of claim 1, wherein voxels of the first set of voxels have a first size and voxels of the second set of voxels have a second size, wherein the first size is larger than the second size.

13. The method of claim 1, wherein the depth data is obtained using one or more depth cameras.

14. The method of claim 1, wherein the depth data comprises pixel depth values from a viewpoint and a sensor position.

15. A device comprising:
a non-transitory computer-readable storage medium; and
one or more processors coupled to the non-transitory computer-readable storage medium, wherein the non-transitory computer-readable storage medium comprises program instructions that, when executed on the one or more processors, cause the device to perform operations comprising:
obtaining depth data of a physical environment using the sensor at a sensor position, the physical environment comprising surfaces;
determining, based on the depth data and determined distances to the surfaces of the physical environment, a plurality of resolutions associated with the obtained depth data;
determining, based on the determined plurality of resolutions, multi-resolution voxels that include at least a first set of voxels that comprises a first resolution and a second set of voxels that comprises a second resolution that is different than the first resolution based on the first set of voxels being positioned at distances within a first distance range of the sensor position and the second set of voxels being positioned at distances within a second distance range of the sensor position; and
generating a single mesh of different resolutions by positioning vertices along a line connecting a first voxel of the first set of voxels corresponding to the first resolution with a second voxel of the second set of voxels corresponding to the second resolution, wherein the single mesh is generated directly from the multi-resolution voxels.

16. The device of claim 15, wherein the single mesh is generated based on a first hash table and a second hash table.

17. The device of claim 16, wherein:
the first hash table is generated based on storing three dimensional (3D) positions of the first set of voxels having signed distance values representing distances to the surfaces of the physical environment based on the depth data; and
the second hash table is generated based on storing 3D positions of the second set of voxels having signed distance values representing distances to the surfaces of the physical environment based on the depth data.

18. The device of claim 17, wherein the signed distance values comprise truncated signed distance field (TSDF) values representing voxel distances of each voxel to a nearest surface of the surfaces of the physical environment corresponding to the depth data.

19. The device of claim 17, wherein the first hash table and second table use the 3D positions as keys to generate memory addresses storing voxel information.

20. A non-transitory computer-readable storage medium, storing program instructions computer-executable on a computer to perform operations comprising:
obtaining depth data of a physical environment using the sensor at a sensor position, the physical environment comprising surfaces;
determining, based on the depth data and determined distances to the surfaces of the physical environment, a plurality of resolutions associated with the obtained depth data;
determining, based on the determined plurality of resolutions, multi-resolution voxels that include at least a first set of voxels that comprises a first resolution and a second set of voxels that comprises a second resolution that is different than the first resolution based on the first set of voxels being positioned at distances within a first distance range of the sensor position and the second set of voxels being positioned at distances within a second distance range of the sensor position; and
generating a single mesh of different resolutions by positioning vertices along a line connecting a first voxel of the first set of voxels corresponding to the first resolution with a second voxel of the second set of voxels corresponding to the second resolution, wherein the single mesh is generated directly from the multi-resolution voxels.

* * * * *